(12) United States Patent
Kimmel

(10) Patent No.: US 11,567,324 B2
(45) Date of Patent: Jan. 31, 2023

(54) EXIT PUPIL EXPANDER

(71) Applicant: Magic Leap, Inc., Plantation, FL (US)

(72) Inventor: Jyrki Sakari Kimmel, Tampere (FI)

(73) Assignee: Magic Leap, Inc., Plantation, FL (US)

( * ) Notice: Subject to any disclaimer, the term of this patent is extended or adjusted under 35 U.S.C. 154(b) by 118 days.

(21) Appl. No.: 16/748,193

(22) Filed: Jan. 21, 2020

(65) Prior Publication Data
US 2020/0159024 A1  May 21, 2020

Related U.S. Application Data

(63) Continuation of application No. 15/659,732, filed on Jul. 26, 2017, now Pat. No. 10,578,870.

(51) Int. Cl.
*G02B 27/01* (2006.01)
*G02B 27/00* (2006.01)
*G02B 27/42* (2006.01)

(52) U.S. Cl.
CPC ..... *G02B 27/0172* (2013.01); *G02B 27/0081* (2013.01); *G02B 27/4205* (2013.01); *G02B 2027/0112* (2013.01)

(58) Field of Classification Search
CPC ............ G02B 27/0172; G02B 27/0081; G02B 27/4205; G02B 2027/0112; G02B 5/0011–0095
See application file for complete search history.

(56) References Cited

U.S. PATENT DOCUMENTS

| 4,344,092 A | 8/1982 | Miller |
| 4,652,930 A | 3/1987 | Crawford |
| 4,810,080 A | 3/1989 | Grendol et al. |

(Continued)

FOREIGN PATENT DOCUMENTS

| CN | 107683497 A1 | 2/2018 |
| EP | 0504930 A1 | 3/1992 |

(Continued)

OTHER PUBLICATIONS

"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).

(Continued)

*Primary Examiner* — Kimberly N. Kakalec
(74) *Attorney, Agent, or Firm* — Stephen M. De Klerk

(57) ABSTRACT

An exit pupil expander (EPE) has entrance and exit pupils, a back surface adjacent to the entrance pupil, and an opposed front surface. In one embodiment the EPE is geometrically configured such that light defining a center wavelength that enters at the entrance pupil perpendicular to the back surface experiences angularly varying total internal reflection between the front and back surfaces such that the light exiting the optical channel perpendicular to the exit pupil is at a wavelength shifted from the center wavelength. In another embodiment a first distance at the entrance pupil between the front and back surfaces is different from a second distance at the exit pupil between the front and back surfaces. The EPE may be deployed in a head-wearable imaging device (e.g., virtual or augmented reality) where the entrance pupil in-couples light from a micro display and the exit pupil out-couples light from the EPE.

17 Claims, 8 Drawing Sheets

(56) References Cited

U.S. PATENT DOCUMENTS

| | | |
|---|---|---|
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,385,735 B1 | 5/2002 | Wilson |
| 6,538,655 B1 | 3/2003 | Kubota |
| 6,541,736 B1 | 4/2003 | Huang et al. |
| 6,757,068 B2 | 6/2004 | Foxlin |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr |
| 7,119,819 B1 | 10/2006 | Robertson et al. |
| 7,219,245 B1 | 5/2007 | Raghuvanshi |
| 7,431,453 B2 | 10/2008 | Hogan |
| 7,542,040 B2 | 6/2009 | Templeman |
| 7,758,185 B2 | 7/2010 | Lewis |
| 8,060,759 B1 | 11/2011 | Arnan et al. |
| 8,214,660 B2 | 7/2012 | Capps, Jr |
| 8,246,408 B2 | 8/2012 | Elliot |
| 8,353,594 B2 | 1/2013 | Lewis |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,582,060 B2 | 2/2017 | Balatsos |
| 9,658,473 B2 | 5/2017 | Lewis |
| 9,671,566 B2 | 6/2017 | Abovitz et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,151,937 B2 | 12/2018 | Lewis |
| 10,185,147 B2 | 1/2019 | Lewis |
| 10,218,679 B1 | 2/2019 | Jawahar |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 * | 3/2020 | Kimmel ............. G02B 27/4205 |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 2001/0010598 A1 | 8/2001 | Aritake et al. |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0122648 A1 | 9/2002 | Mule'et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0174496 A1 | 9/2004 | Ji et al. |
| 2004/0186902 A1 | 9/2004 | Stewart |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0157159 A1 | 7/2005 | Komiya et al. |
| 2005/0177385 A1 | 8/2005 | Hull |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0129852 A1 | 6/2006 | Bonola |
| 2006/0132914 A1 | 6/2006 | Weiss et al. |
| 2006/0179329 A1 | 8/2006 | Terechko |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0173036 A1 | 7/2008 | Willaims |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0316768 A1 | 12/2008 | Travis |
| 2009/0153797 A1 | 6/2009 | Allon et al. |
| 2009/0224416 A1 | 9/2009 | Laakkonen et al. |

(56) References Cited

U.S. PATENT DOCUMENTS

| | | |
|---|---|---|
| 2009/0310633 A1 | 12/2009 | Ikegami |
| 2010/0005326 A1 | 1/2010 | Archer |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0153934 A1 | 6/2010 | Lachner |
| 2010/0194632 A1 | 8/2010 | Raento et al. |
| 2010/0232031 A1 | 9/2010 | Batchko et al. |
| 2010/0244168 A1 | 9/2010 | Shiozawa et al. |
| 2011/0021263 A1 | 1/2011 | Anderson et al. |
| 2011/0022870 A1 | 1/2011 | Mcgrane |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050833 A1 | 2/2013 | Lewis et al. |
| 2013/0051730 A1 | 2/2013 | Travers et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0169923 A1 | 7/2013 | Schnoll et al. |
| 2013/0205126 A1 | 8/2013 | Kruglick |
| 2013/0268257 A1 | 10/2013 | Hu |
| 2013/0278633 A1 | 10/2013 | Ahn et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2015/0005785 A1 | 1/2015 | Olson |
| 2015/0009099 A1 | 1/2015 | Queen |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0033770 A1 | 2/2016 | Fujimaki et al. |
| 2016/0085285 A1 | 3/2016 | Mangione-Smith |
| 2016/0093099 A1 | 3/2016 | Bridges |
| 2016/0093269 A1 | 3/2016 | Buckley et al. |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0185261 A1 | 6/2017 | Perez et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0219841 A1* | 8/2017 | Popovich ............. G02B 6/0016 |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1* | 8/2017 | Piskunov ................. G02B 5/32 |
| | | 359/13 |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |

(56) References Cited

U.S. PATENT DOCUMENTS

| | | |
|---|---|---|
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0129112 A1 | 5/2018 | Osterhout |
| 2018/0131907 A1 | 5/2018 | Schmirier et al. |
| 2018/0136466 A1 | 5/2018 | Ko |
| 2018/0151796 A1 | 5/2018 | Akahane |
| 2018/0188115 A1 | 7/2018 | Hsu et al. |
| 2018/0190017 A1 | 7/2018 | Mendez et al. |
| 2018/0191990 A1 | 7/2018 | Motoyama et al. |
| 2018/0218545 A1 | 8/2018 | Garcia et al. |
| 2018/0250589 A1 | 9/2018 | Cossairt et al. |
| 2018/0284877 A1 | 10/2018 | Klein |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0155439 A1 | 5/2019 | Mukherjee et al. |
| 2019/0158926 A1 | 5/2019 | Kang et al. |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0219815 A1 | 7/2019 | Price et al. |
| 2019/0243123 A1 | 8/2019 | Bohn |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2020/0098188 A1 | 3/2020 | Bar-Zeev et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0202759 A1 | 6/2020 | Ukai et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0142582 A1 | 5/2021 | Jones et al. |
| 2021/0158627 A1 | 5/2021 | Cossairt et al. |
| 2021/0173480 A1 | 6/2021 | Osterhout et al. |

FOREIGN PATENT DOCUMENTS

| | | |
|---|---|---|
| EP | 0535402 A1 | 4/1993 |
| EP | 1215522 A2 | 6/2002 |
| EP | 1938141 A1 | 7/2008 |
| EP | 1943556 A2 | 7/2008 |
| EP | 2290428 A2 | 3/2011 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2011-033993 A | 2/2011 |
| JP | 2012-015774 A | 1/2012 |
| JP | 2015-191032 A | 11/2015 |
| JP | 2016-85463 A | 5/2016 |
| JP | 2017-531840 A | 10/2017 |
| JP | 6232763 B2 | 11/2017 |
| TW | 201219829 A | 5/2012 |
| TW | 201803289 A | 1/2018 |
| WO | 2002/071315 A2 | 9/2002 |
| WO | 2006132614 A1 | 12/2006 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2015143641 A1 | 10/2015 |
| WO | 2017004695 A1 | 1/2017 |
| WO | 2017044761 A1 | 3/2017 |
| WO | 2017120475 A1 | 7/2017 |
| WO | 2017176861 A1 | 10/2017 |
| WO | 2017/203201 A1 | 11/2017 |
| WO | 2018/044537 A1 | 3/2018 |
| WO | 2018087408 A1 | 3/2018 |
| WO | 2018097831 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

International Search Report and Written Opinion dated Sep. 4, 2020, International Patent Application No. PCT/US20/31036, (13 pages).
Invitation to Pay Additional Fees mailed Sep. 24, 2020, International Patent Application No. PCT/US2020/043596, (3 pages).
Non Final Office Action dated Sep. 1, 2020, U.S. Appl. No. 16/214,575, (40 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Azuma, Ronald T. , "A Survey of Augmented Reality", Presence Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Jacob, Robert J. , "Eye Tracking in Advanced Interface Design", Human-Computer Interaction Lab, Naval Research Laboratory, Washington, D.C., date unknown. 2003, pp. 1-50.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Communication Pursuant to Article 94(3) EPC dated Sep. 4, 2019, European Patent Application No. 10793707.0, (4 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).

(56) References Cited

OTHER PUBLICATIONS

Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US 19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees mailed Aug. 15, 2019, International PCT Patent Application No. PCT/US19/36275, (2 pages).
Invitation to Pay Additional Fees mailed on Oct. 22, 2019, International PCT Patent Application No. PCT/US19/47746, (2 pages).
Invitation to Pay Additional Fees mailed on Apr. 3, 2020, International Patent Application No. PCT/US20/17023, (2 pages).
Invitation to Pay Additional Fees mailed on Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Notice of Allowance dated Mar. 25, 2020, U.S. Appl. No. 15/564,517, (11 pages).
Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Azom, , "Silica—Silicon Dioxide (SiO2)", AZO Materials; Publication [Online], Dec. 13, 2001 [retrieved Feb. 19, 2020]. Retrieved from the Internet: <URL: https://www.azom.com/article.aspx?Article1D=1114>, (6 pages).
Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>, (9 pages).
Levola, T. , "Diffractive Optics for Virtual Reality Displays", Journal of the SID Eurodisplay 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; (online], Dec. 24, 2010 (retrieved Feb. 19, 2020]., <URL: http:/fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Nov. 24, 2020, U.S. Appl. No. 16/435,933, (44 pages).
International Search Report and Written Opinion dated Feb. 12, 2021, International Application No. PCT/US20/60555, (25 pages).

(56) References Cited

OTHER PUBLICATIONS

International Search Report and Written Opinion dated Feb. 2, 2021, International PCT Patent Application No. PCT/US20/60550, (9 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Mar. 3, 2021, U.S. Appl. No. 16/427,337, (41 pages).
Non Final Office Action dated Nov. 5, 2020, U.S. Appl. No. 16/530,776, (45 pages).
"Phototourism Challenge", CVPR 2019 Image Matching Workshop. https://image matching-workshop. github.io., (16 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract, pp. 1-6 and 9.
Arandjelović, Relja et al., "Three things everyone should know to improve object retrieval", CVPR, 2012, (8 pages).
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).
Caetano, Tibério S et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).

Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.
Loiola, Eliane M. et al., "A survey for the quadratic assignment problem", European journal of operational research, 176(2): 2007, pp. 657-690.
Lowe, David G. , "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv: 1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).

(56) References Cited

OTHER PUBLICATIONS

Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911. 11763>, entire document, especially.
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Thomee, Bart et al., "YFCC100m: The new data in multimedia research", Communications of the ACM, 59(2):64-73, 2016; arXiv:1503. 01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710. 10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711. 07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs. CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908. 04964v1 [cs.CV] Aug. 14, 2019, (11 pages).
Zhang, Li et al., "Dual graph convolutional net-work for semantic segmentation", BMVC, 2019; arXiv:1909.06121v3 [cs.CV] Aug. 26, 2020, (18 pages).
Communication Pursuant to Article 94(3) EPC dated Oct. 21, 2021, European Patent Application No. 16207441.3 , (4 pages).
Communication Pursuant to Rule 164(1) EPC dated Jul. 27, 2021, European Patent Application No. 19833664.6 , (11 pages).
Extended European Search Report dated Jun. 30, 2021, European Patent Application No. 19811971.1 , (9 pages).
Extended European Search Report dated Mar. 4, 2021, European Patent Application No. 19768418.6 , (9 pages).
Extended European Search Report dated Jul. 16, 2021, European Patent Application No. 19810142.0 , (14 pages).
Extended European Search Report dated Jul. 30, 2021, European Patent Application No. 19839970.1 , (7 pages).
Extended European Search Report dated Oct. 27, 2021, European Patent Application No. 19833664.6 , (10 pages).
Extended European Search Report dated Sep. 20, 2021, European Patent Application No. 19851373.1 , (8 pages).
Extended European Search Report dated Sep. 28, 2021, European Patent Application No. 19845418.3 , (13 pages).
Final Office Action dated Jun. 15, 2021, U.S. Appl. No. 16/928,313 , (42 pages).
Final Office Action dated Mar. 1, 2021, U.S. Appl. No. 16/214,575 , (29 pages).
Final Office Action dated Mar. 19, 2021, U.S. Appl. No. 16/530,776 , (25 pages).
Final Office Action dated Sep. 17, 2021, U.S. Appl. No. 16/938,782 , (44 pages).
Non Final Office Action dated Aug. 4, 2021, U.S. Appl. No. 16/864,721 , (51 pages).
Non Final Office Action dated Jul. 9, 2021, U.S. Appl. No. 17/002,663 , (43 pages).
Non Final Office Action dated Jul. 9, 2021, U.S. Appl. No. 16/833,093 , (47 pages).
Non Final Office Action dated Jun. 10, 2021, U.S. Appl. No. 16/938,782 , (40 Pages).
Non Final Office Action dated Jun. 29, 2021, U.S. Appl. No. 16/698,588 , (58 pages).
Non Final Office Action dated May 26, 2021, U.S. Appl. No. 16/214,575 , (19 pages).
Non Final Office Action dated Sep. 20, 2021, U.S. Appl. No. 17/105,848 , (56 pages).
Giuseppe, Donato , et al. , "Stereoscopic helmet mounted system for real time 3D environment reconstruction and indoor ego-motion estimation", Proc. SPIE 6955, Head- and Helmet-Mounted Displays XIII: Design and Applications , 69550P.
Molchanov, Pavlo , et al. , "Short-range FMCW monopulse radar for hand-gesture sensing", 2015 IEEE Radar Conference (RadarCon) (2015) , pp. 1491-1496.
Sheng, Liu , et al. , "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, ISSN: 0146-9592 , pp. 1642-1644.
Communication according to Rule 164(1) EPC dated Feb. 23, 2022, European Patent Application No. 20753144.3, (11 pages).
Communication Pursuant to Article 94(3) EPC dated Jan. 4, 2022, European Patent Application No. 20154070.5, (8 pages).
Extended European Search Report dated Jan. 28, 2022, European Patent Application No. 19815876.8, (9 pages).
Extended European Search Report dated Jan. 4, 2022, European Patent Application No. 19815085.6, (9 pages).
Extended European Search Report dated Jun. 19, 2020, European Patent Application No. 20154750.2, (10 pages).
Final Office Action dated Feb. 3, 2022, U.S. Appl. No. 16/864,721, (36 pages).
"Multi-core processor", TechTarget, 2013, (1 page).
Non Final Office Action dated Apr. 1, 2022, U.S. Appl. No. 17/256,961, (65 pages).
Non Final Office Action dated Apr. 11, 2022, U.S. Appl. No. 16/938,782, (52 pages).
Non Final Office Action dated Apr. 12, 2022, U.S. Appl. No. 17/262,991, (60 pages).
Non Final Office Action dated Feb. 2, 2022, U.S. Appl. No. 16/783,866, (8 pages).
Non Final Office Action dated Mar. 31, 2022, U.S. Appl. No. 17/257,814, (60 pages).

(56) References Cited

OTHER PUBLICATIONS

Non Final Office Action dated Mar. 9, 2022, U.S. Appl. No. 16/870,676, (57 pages).
Mrad, et al., "A framework for System Level Low Power Design Space Exploration", 1991.
"Communication Pursuant to Article 94(3) EPC dated Apr. 25, 2022", European Patent Application No. 18885707.2, (5 pages).
"Communication Pursuant to Article 94(3) EPC dated May 30, 2022", European Patent Application No. 19768418.6, (6 pages).
"Extended European Search Report dated Mar. 22, 2022", European Patent Application No. 19843487.0, (14 pages).
"Extended European Search Report dated May 16, 2022", European Patent Application No. 19871001.4, (9 pages).
"Extended European Search Report dated May 30, 2022", European Patent Application No. 20753144.3, (10 pages).
"First Examination Report dated May 13, 2022", Indian Patent Application No. 202047026359, (8 pages).
"First Office Action dated Mar. 14, 2022 with English translation", Chinese Patent Application No. 201880079474.6, (11 pages).
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"Final Office Action dated Jul. 13, 2022", U.S. Appl. No. 17/262,991, (18 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Jul. 26, 2022", U.S. Appl. No. 17/098,059, (28 pages).
"Non Final Office Action dated Sep. 19, 2022", U.S. Appl. No. 17/263,001, (14 pages).
"Second Office Action dated Jul. 13, 2022 with English Translation", Chinese Patent Application No. 201880079474.6, (10 pages).
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year 1993), pp. 111-121.
"Extended European Search Report dated Nov. 3, 2022", European Patent Application No. 20770244.0, (23 pages).
"First Office Action dated Sep. 16, 2022 with English translation", Chinese Patent Application No. 201980063642.7, (7 pages).
"Notice of Reason for Rejection dated Oct. 28, 2022 with English translation", Japanese Patent Application No. 2020-531452, (3 pages).
"Non Final Office Action dated Dec. 7, 2022", U.S. Appl. No. 17/357,795, (63 pages).
"Office Action dated Nov. 24, 2022 with English Translation", Japanese Patent Application No. 2020-533730, 11 pages).

\* cited by examiner

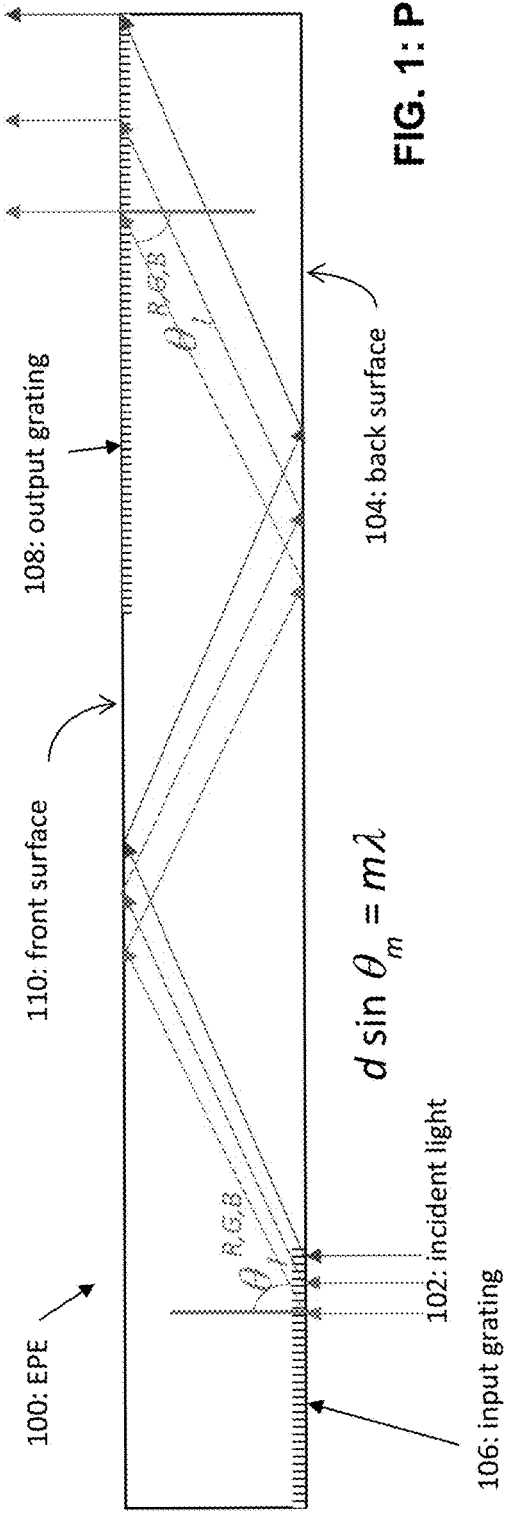
FIG. 1: Prior Art
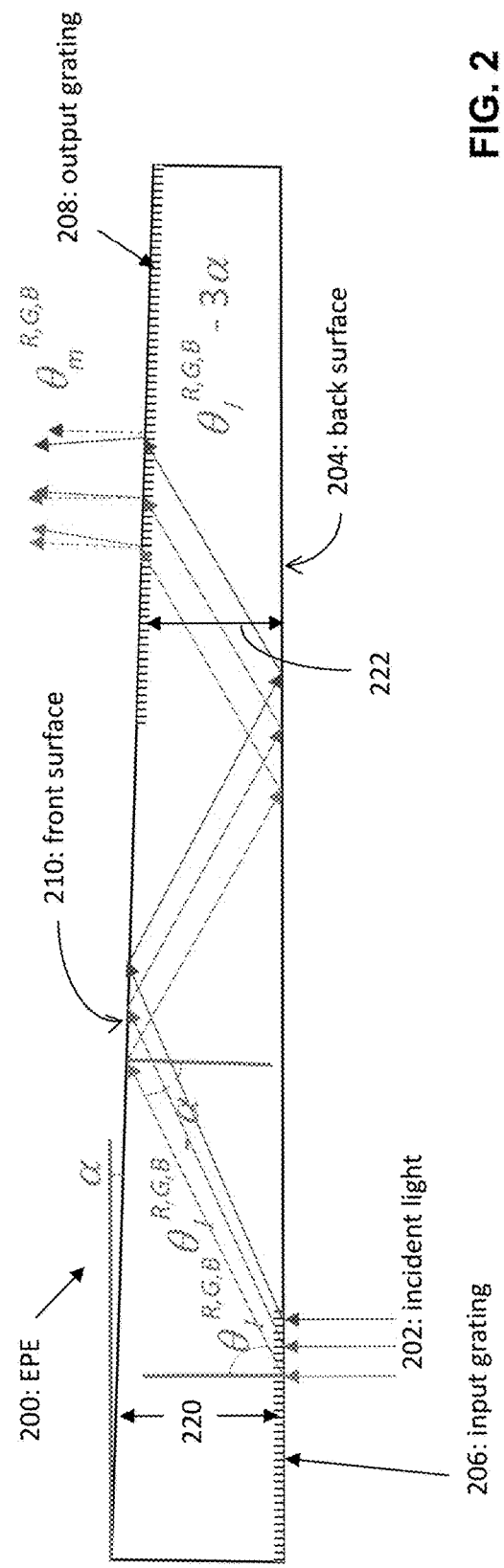
FIG. 2

FIG. 4

EXIT PUPIL EXPANDER

CROSS-REFERENCE TO RELATED APPLICATIONS

This is a continuation of U.S. patent application Ser. No. 15/659,732, filed on Jul. 26, 2017, all of which is incorporated herein by reference in its entirety

TECHNOLOGICAL FIELD

The described invention relates to optical channels, and more particularly to controlling the color space across the output grating of an optical exit pupil expander such as may be disposed in a head-wearable imaging device/computer that projects an image directly in front of a user's eye.

BACKGROUND

Certain wearable computers such as those embodied as eyeglasses or virtual technology goggles project an image directly in front of a user's eye. In eyeglass type devices these projections are see-through so the user can see the projected data in the near field while the visual real-world in the far field remains largely unobscured. In virtual reality devices the user is isolated from perceiving the real world so the display needs to fill the user's entire field of vision. One challenge with such wearable displays is to produce an adequate eye-box in which the viewer can view the data that is projected by the micro-display. Such an the eye-box for see-through displays measures about 10-12 mm in the vertical and in the horizontal and the eye relief is in the range of 20-30 mm. For virtual reality devices the eye box is necessarily larger and often the eye relief is a bit longer. Retinal scanning display devices project the image directly on the user's retina so the eye-box is smaller and the eye relief is closer to zero. Due to the nature of such wearable devices the space constraints limit the reach of the optics and so one challenge is to keep that eye-box from shrinking to only a few mm, given the optical train (often located at the side of the user's head for see-through displays) is limited by practical limits to the size of such wearable devices. These size limits to the optical train also adversely affect the color space seen by the user. Color space may be a peripheral matter for see through displays where only data is being displayed but is critical for virtual reality devices whose effectiveness relies on the display persuading a certain level of the user's consciousness that the scene represents more than only a virtual world.

The exit pupil expander (EPE) is the optical component that would replace the geometric optics that have traditionally been used to expand the size of the eye-box in head-wearable visual devices. In optics the exit pupil is a virtual aperture in that only rays which pass through this virtual aperture can exit the system. The exit pupil is the image of the aperture stop in the optics that follow it. The term exit pupil is sometimes also used to refer to the diameter of the virtual aperture. Unlike the optics of conventional cameras or telescopes, an exit pupil expander of a wearable virtual reality or see-through device is designed to display for near-distance viewing.

Numerical aperture expander is a less common term sometimes used with reference to retinal scanning displays which project an image through the pupil directly on the user's retina. The numerical aperture of the light emanating from display pixels determines the exit pupil size, and retinal scanning displays project a rastered image about the size of the user's eye pupil at an intermediate plane. Retinal scanning displays can be used for virtual reality applications.

Diffractive exit pupil expanders have diffraction gratings that pose an inherent problem in controlling the color space. Because of diffraction the input and output gratings diffract different color bands of light into different output angles. This results in the user's perception of the color space of the scene being displayed having a varying color balance across the user's field of view.

Conventional exit pupil expanders typically have a very high degree of parallelism which FIG. 1 demonstrates with parallel front and back surfaces of the EPE. Incident light 102 enters the EPE 100 via the back surface 104 and encounters an input grating 106. Light propagates inside the EPE 100 by multiple total internal reflections (TIR) and the color space is controlled by having a stack of EPE plates, for example separate plates for red (R) and green (G) as well as blue (B) primary color bands. Light exiting the EPE 100 is expanded by these internal reflections and passes through an output grating 108 and exits normal to the front surface 110, which is parallel to the opposed back surface 104. This plate stacking necessarily complicates the design and raises its cost. The individual beams in FIG. 1 represent different colors (R, G, B) each defining a different wavelength $\lambda$.

SUMMARY

According to a first aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength.

According to a second aspect of these teachings there is an optical channel comprising an entrance pupil enabling light to enter the optical channel, an exit pupil enabling the light to exit the optical channel, a back surface adjacent to the entrance pupil, and a front surface opposite the back surface. In this particular aspect the optical channel is configured such that a first distance at the entrance pupil between the front surface and the back surface is different from a second distance at the exit pupil between the front surface and the back surface.

According to a third aspect of these teachings there is a head-wearable imaging device comprising a micro display and an exit pupil expander. The head-wearable imaging device may for example be a virtual reality device or an augmented reality device. In either case the exit pupil expander comprises: an entrance pupil configured to in-couple light from the micro-display; an exit pupil configured to out-couple light from the exit pupil expander; a back surface adjacent to the entrance pupil; and a front surface opposite the back surface. In this embodiment, as with the optical channel of the first aspect, the exit pupil expander is geometrically configured such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. In another embodiment the exit pupil expander may be as described above for the optical channel according to the second aspect of these teachings.

BRIEF DESCRIPTION OF THE DRAWINGS

FIG. 1 is a schematic diagram illustrating a prior art exit pupil expander with parallel front and back surfaces according to the prior art.

FIG. 2 is a schematic diagram illustrating a wedge-shaped exit pupil expander with non-parallel front and back surfaces according to an embodiment of these teachings.

FIG. 4 quantitatively tabulates the color shift of red, green and blue light passing through a wedge-shaped EPE such as that shown at FIG. 2, with $\alpha=0.25$ degrees.

DETAILED DESCRIPTION

Figure 3:
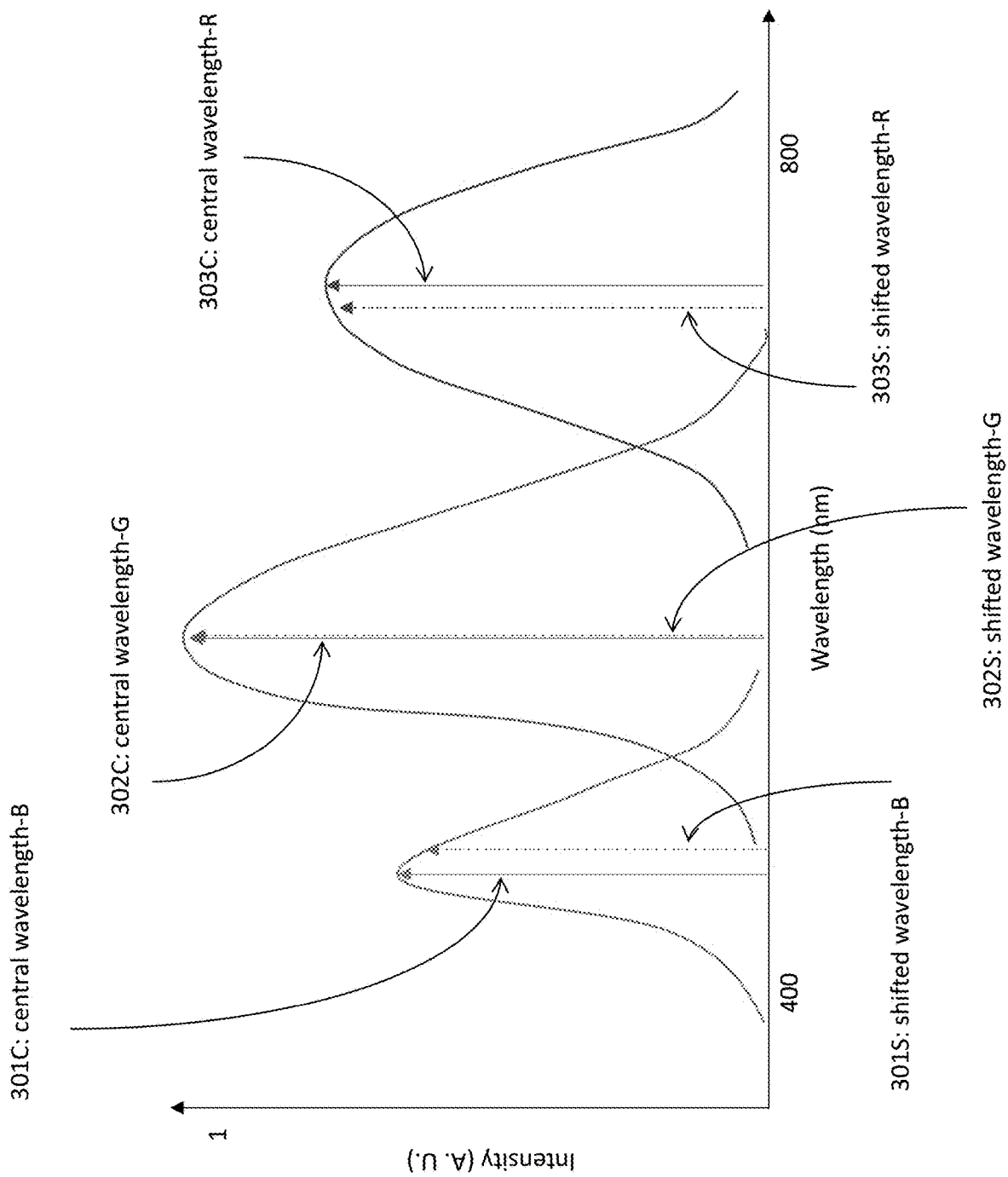
FIG. 3 is a plot of light intensity showing for each of R, G and B wavelengths a central peak and a shifted wavelength in the out-coupled light from a wedge-shaped EPE such as that shown at FIG. 2.

Certain non-limiting embodiments of these teachings provide a wedge-shaped EPE (exit pupil expander) plate for controlling color space as generally shown at FIG. 2. In the wedge-shaped EPE 200, the front 210 and opposed back 204 surfaces of the EPE 200 are non-parallel. These surfaces 204, 210 refer to internal reflective surfaces upon which the light reflects within the optical channel/EPE 200 and are sometimes referred to as plates. Light 202 propagates inside the EPE 200 through total internal reflection from these surfaces 204, 210 and experiences a varying degree of angular variation due to non-parallelism of these surfaces/plates 204, 210. Hence, at the output grating 208, the angular spread of the out-coupled light is affected and a user sees the angular shift as a color change of the light source as compared to the incident light 202 that was input through the back surface 204 at the input grating 206. That is, the wedge-shaped EPE 200 shifts the diffracted light from the central emitted wavelength of the light source, which in FIG. 2 is represented as the incident light 202. Improved color balance is achieved by controlling the wedge-shape of the EPE 200.

More particularly, the light reflecting off these surfaces 204, 210 propagating inside the wedge-shaped EPE 200 by TIR experiences a varying degree of angular variation, as a result of the non-parallelism of the surfaces/plates 204, 210. This affects the angular spread of the out-coupled light that exits the EPE 200 through the front surface 210 at the output grating 208. In particular, if light-emitting diodes (LEDs) are used as light sources (the incident light 202) for the optical engine providing the image, the user will see the resulting angular shift as a color change of the light source because the diffracted light is shifted from the dominant or from the central-emitted wavelength of the LED. The light that is coupled in with a slightly different wavelength is indicated by dashed arrows in FIG. 2 that exit normal/perpendicular to the front surface 210 while light at the wavelength peak exits somewhat offset from the normal. An improved color balance in the overall system can be achieved by controlling the wedge shape of the EPE 200, more particularly by controlling the extent of the non-parallelism of the internal reflective surfaces/plates 202, 210.

The optical channel/EPE 200 of FIG. 2 is configured such that a first distance 220 at the entrance pupil/input grating 206 between the front surface 210 and the back surface 204 is different from a second distance 222 at the exit pupil/output grating 208 between the front surface 210 and the back surface 204. The specific location of these distances 220, 222 in FIG. 2 is to avoid obscuring the ray traces through the channel; the appropriate locations would follow one particular ray of a given wavelength from input to output pupil (which are delineated in the drawings as input and output gratings) of the channel/EPE 200. In a particular but non-limiting embodiment the extent of the wedge is such that this wavelength ray tracing is not relevant to these distances, where for example a smallest first distance 220 anywhere along the entrance pupil/input grating 206 is larger than a largest second distance 222 anywhere along the exit pupil/output grating 208.

Consider this distinction between FIGS. 1 and 2 quantitatively. Assuming for simplicity that the characteristics of the input grating and the output grating are identical, the output coupled light experiences a color shift across the output grating. The grating equation $d \sin \theta_m = m\lambda$ (also shown at FIG. 1) describes the coupling angle of the light for each central wavelength $\lambda$ for Red, Green, and Blue. In FIG. 2, the improved color balance achieved by the wedged plates 204, 210 is shown. If the wedge angle $\alpha$ shown at FIG. 2 is chosen appropriately, the color shift across the output grating 208 is offset by the shift in the central wavelength of the respective light sources for R, G, and B. In FIG. 2 the central wavelength is followed with solid lines, and the shifted wavelengths are shown in dashed lines.

This is also shown in FIG. 3, where the spectra of the light sources are shown, with solid line indicators for the central (peak) wavelengths for Blue 301C; Green 302C and Red 303C as well as dashed line indicators for the shifted wavelengths for Blue 301S; Green 302S and Red 303S as seen by the user when the EPE is wedge-shaped as shown by the FIG. 2 example embodiment.

Figure 4:
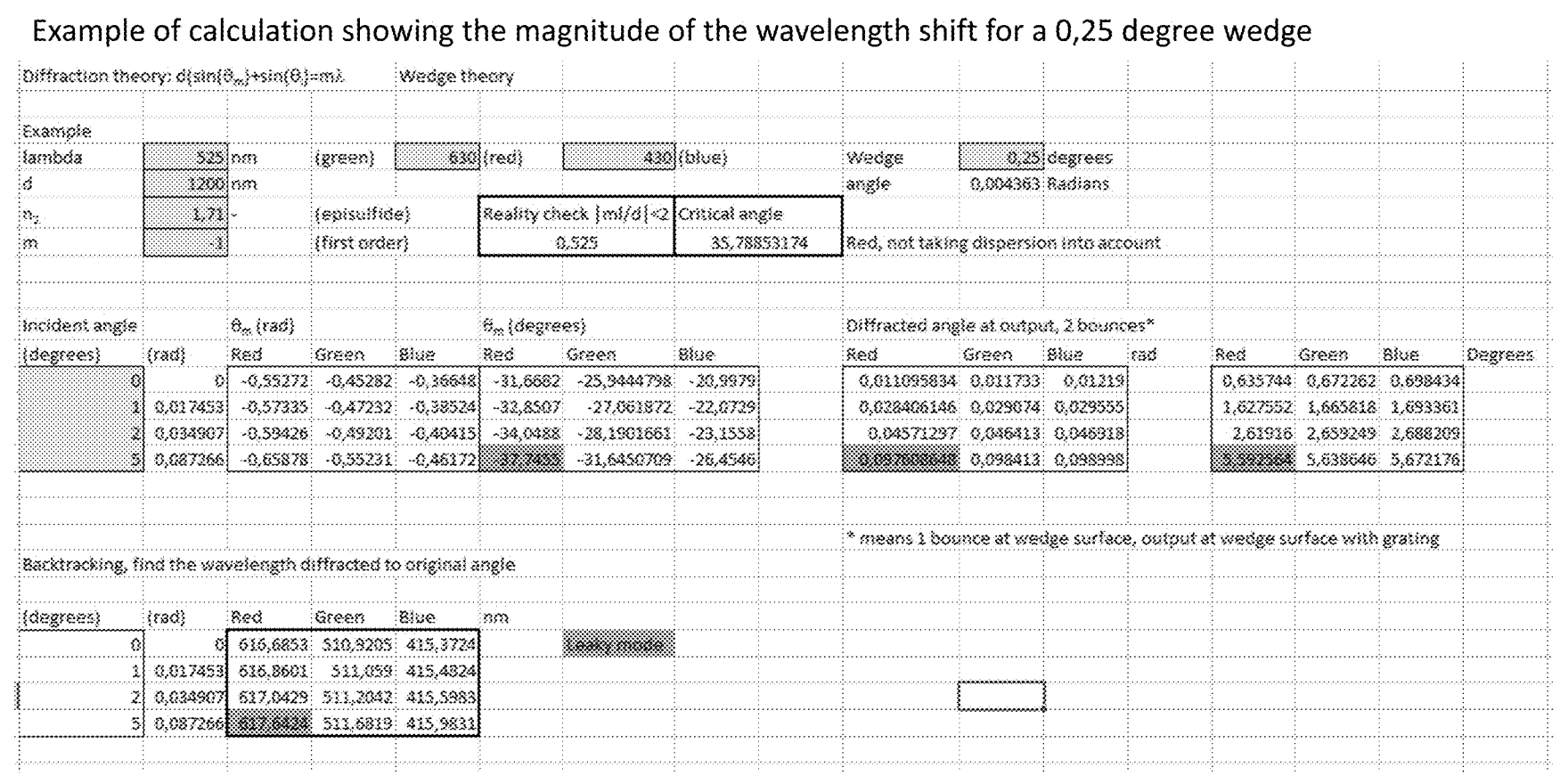

FIG. 4 reproduces the calculations for the color shifting plotted at FIG. 3. Green light input at the input grating has wavelength $\lambda=525$ nm; red light input has wavelength $\lambda=630$ nm; and blue light input has wavelength $\lambda=430$ nm. The wedge angle $\alpha$ shown at FIG. 2 is $\alpha=0.25$ degrees, the distance between slits on the input grating is $d=1200$ nm (consistent with the assumption above the input and output gratings are identical), $\theta_m$ is the diffraction angle at which phases add to produce a maxima, and air is the medium within the EPE. As can be seen from FIG. 4 the color shift $\Delta\lambda$ of green light is $\Delta\lambda \approx (525-511 \text{ nm}) = 14 \text{ nm} \approx 2.5\%$; the color shift of red light is $\Delta\lambda \approx (630-617 \text{ nm}) = 13 \text{ nm} \approx 2.0\%$; and the color shift of blue light is $\Delta\lambda \approx (430-415 \text{ nm}) = 15$ nm≈3.5%. At least for the narrowing wedge shape the color shift is more pronounced for shorter wavelengths. FIG. 4 also shows the angular differences between the diffracted input and output angles. If the value of the angle α were set to zero the resulting EPE would be as shown at FIG. 1 and the calculations shown at FIG. 4 would return to the original (input) wavelength and the output angles would be equal to the input angles.

The basic wedge-shaped EPE 200 is only one of several EPE designs that will produce a color shift in the out-coupled light according to these teachings. While the FIG. 2 example shows the wedge narrowing between the input 202 (input grating 206) and the output (output grating 210) a similar color shifting benefit can be achieved with an expanding or widening wedge shape.

Figure 5:
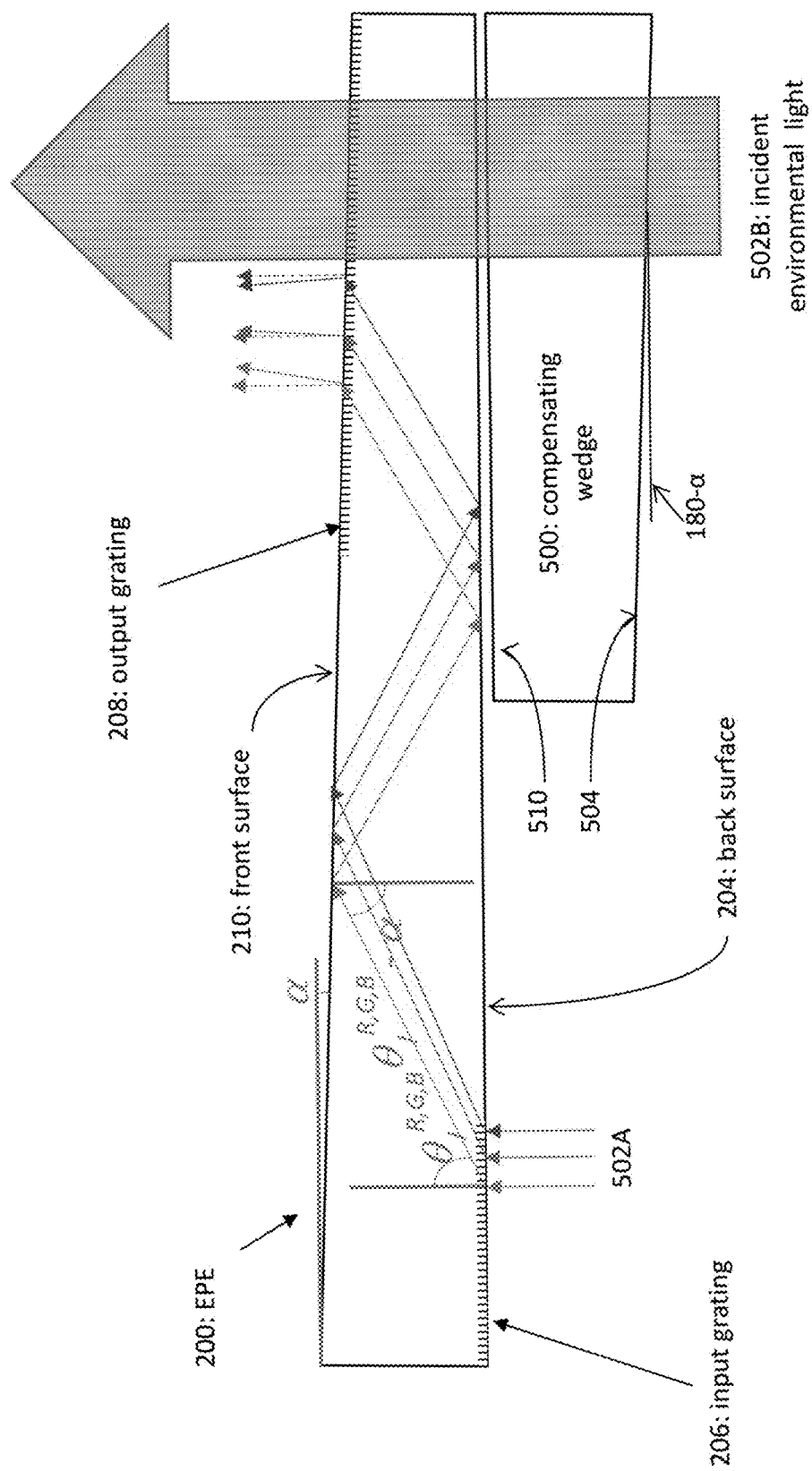
FIG. 5 is similar to FIG. 2 but further illustrating a compensating wedge for see-through (non-virtual reality) type applications according to an example embodiment.

FIG. 5 illustrates how a basic wedge-shape such as that shown at FIG. 2 can be adapted for a see-through display such as an eye-glass mounted micro-display that is transparent to visible light from the user's environment. Like reference numbers denote similar features as detailed above with respect to FIG. 2. For such a non-virtual reality device the user will want to perceive his/her surroundings without the color-shifting aspects imposed by the wedge shaped EPE 200. The incident light 202 forming the image to be projected in front of or on the user's eye is designated 502A in FIG. 5 to distinguish over the incident environmental light 502B that the user perceives directly that is not subject to internal reflection off the non-parallel surfaces 204, 210 within the EPE 200. That incident environmental light 502B passes through a compensating wedge 500 that defines opposed surfaces 510, 504 such that the surface 510 adjacent to the wedge-shaped EPE 200 is parallel to the back surface 204 of the EPE 200 and the surface opposite the EPE 200 is parallel to the front surface 210 of the EPE 200. So while the non-parallelism of the EPE 200 narrows between the input and output pupils, the compensating wedge widens to exactly match across the expanse of the compensating wedge 500 (or at least across the entrance and exit pupils of that compensating wedge 500). The angle α shown for the EPE 200 is the same angle α used for the compensating wedge 500 but offset 180 degrees (shown as 180-α on the compensating wedge 500). Aberrations to the incident environmental light 502B due to the angular difference between opposed surfaces 204, 210 of the EPE 200 are exactly offset by the angular difference between opposed surfaces 510, 504 of the compensating wedge 500, which may even be separate from the EPE 200 waveguide.

Figure 6:
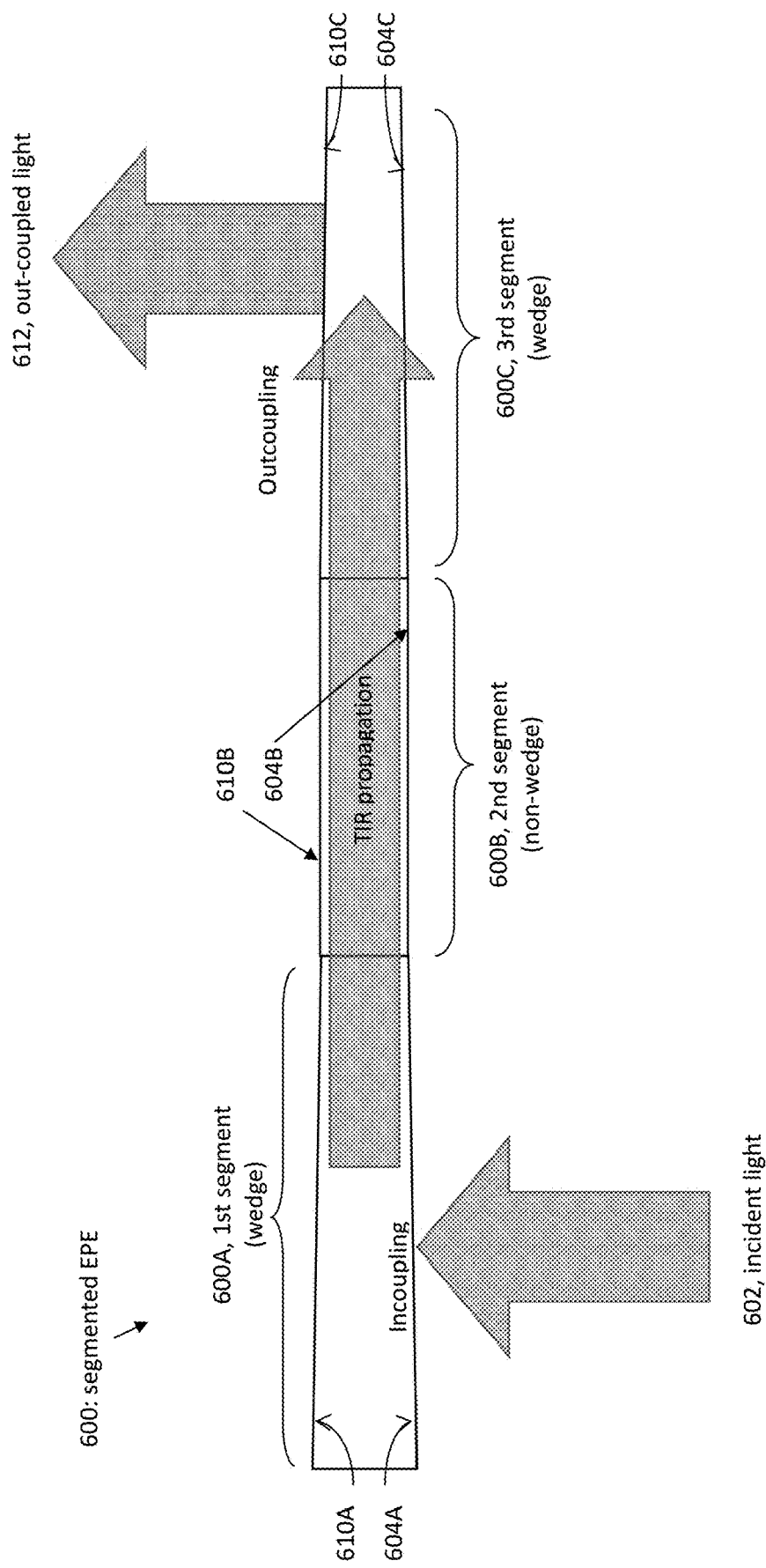
FIG. 6 is a schematic diagram of a segmented exit pupil expander defining multiple discrete segments of which less than all segments impose angularly varying total internal reflection according to these teachings.

Similar color-shifting advantages can be realized with one or more segmented wedge-shapes intermediate between the input and output of the EPE in which case the input and output surfaces at which the input and output gratings are disposed can be parallel themselves, as shown by example at FIG. 6. This segment-wise wedged EPE 600 defines three distinct segments 600A, 600B, 600C through which the incident light 602 propagates. Incident light 602 from the computer of the overall optical headset/eyeglass device forming the image to be projected is in-coupled through the back surface 604A of the first segment 600A which defines a narrowing wedge between opposed internal reflective surfaces 604A and 610A. From this first segment 600A the light continues through the second segment 600B which has parallel opposed internal reflective surfaces 604B, 610B. The light continues into the third segment 600C where it is out coupled 612 after reflecting between back 604C and front 610C surfaces which also define a narrowing wedge. In various embodiments there may be only one wedge segment 600A, 600C, and if there are multiple wedge segments 600A, 600C they may define the same or different wedge angles α. At least input and output gratings similar to those shown at FIG. 2 are assumed though not shown at FIG. 6, and further the second segment 600B with parallel opposed surfaces 604B, 610B may also incorporate diffraction gratings along those surfaces.

It is known to incorporate into the design of an EPE intermediate vertical expansion gratings, which in FIG. 1 would run vertically between the opposed surfaces 104, 110. Where such vertical expansion gratings are used in a multi-segment EPE 600 such as that shown at FIG. 6 they are preferably disposed in the second segment 600B which exhibits a high degree of parallelism between the opposed surfaces 604B, 610B. In this case the wedge can be on either side of the non-wedge segment 600B in which the intermediate vertical expansion plates are disposed, or in other embodiments there may be one or more wedge segments before or after the non-wedge parallel segment 600B.

While the embodiments illustrated herein show non-parallel planar surfaces similar advantages can be gained where one or both of such surfaces are curved. The result is qualitatively similar in that the color expansion arises from the non-parallelism of these opposed reflective surfaces but the computations are more extensive to realize a practical EPE as compared to planar non-parallel surfaces.

Figure 7:
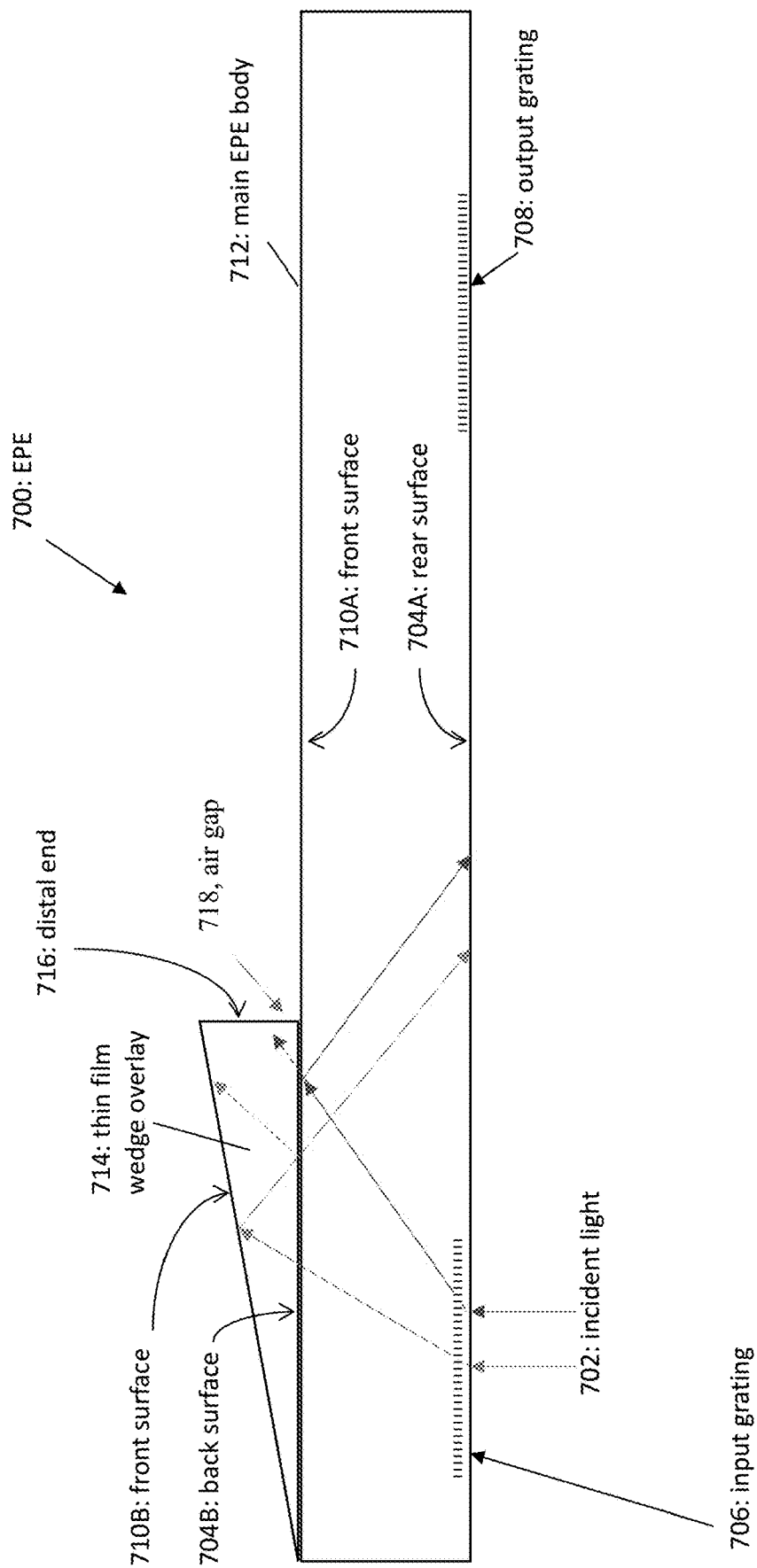
FIG. 7 is a schematic diagram of an exit pupil expander that includes a main channel or body with a thin film wedge overlay that imposes the angularly varying total internal reflection according to these teachings.

FIG. 7 illustrates a further embodiment of an EPE 700 in which there is a thin film wedge 714 overlying the front surface with a thin air gap 718 between the thin film wedge 714 and the main EPE body 712. Optical mediums other than air may also be used for this thin gap. For simplicity the main EPE body 712 has parallel opposed surfaces 704A, 710A. As with FIGS. 1 and 2 incident light 702 enters through the back surface 704A at the input grating 706 and is refracted internal of the channel between those surfaces 704A, 710A. The wedge overlay 714 is disposed opposite that input pupil such that the first refraction at the input grating directs the light towards the wedge overlay 714, which extends along only a portion of the main EPE body 712. The extent of that portion depends on the characteristics of that first diffraction angle and the wavelength or wavelengths the designer selects for evanescent coupling back into the optical channel of the main EPE body 712. The example at FIG. 7 shows blue and red light are incident 702; blue at the left and red at the right of the input grating 706. The blue light reflects into the thin film wedge 714 which extends far enough that a portion of this same blue light is also reflected from its front surface 710B through its back surface 704B to re-enter the main EPE body 712. The distal end 716 of the wedge overlay 714 prevents similar reflection of the red light that entered the wedge overlay 714 from being reflected back into that main EPE body 712. In this manner the 'leaky' input light can be filtered in and other wavelengths of light can be filtered out by selection of the wedge angle of the wedge overlay 714 and the position of the distal end 716 (for a given input grating 706).

In the FIG. 7 embodiment the output grating 708 is disposed along the rear surface 704A to show the advantages of these teachings do not depend on light being out-coupled from the surface opposite where it was in-coupled, and this feature can be incorporated into any of the other examples herein (except for the see-through embodiment of FIG. 5 it would be realized by in-coupling and out-coupling through the front surface 210 to retain the see-through feature). Some conventions prefer to name the surface adjacent to the output grating as the front surface, in which case surface 704A of FIG. 7 would be named the front surface and surface 710A would be named the back/rear surface; the terms front and back or rear surfaces as used herein merely designate opposing surfaces and the input/output pupils are specifically illustrated so there is no ambiguity. Note that the micro-display which provides the image seen by the user is not particularly shown at FIGS. 1-8; the micro-display and optical engine of the host device is the source of the incident light 702 that is in-coupled to the EPE via the input grating and out-coupled from it via the output grating. Micro-displays and optical engines to drive them are well known in the head-wearable visual imaging arts; these known micro-displays and optical engines are suitable for providing the image that is in-coupled to the EPE embodiments described herein and need not be further detailed. In some embodiments of optical devices such as retinal scanning displays the image is projected directly on the user's retina and such embodiments may or may not have any output grating at the exit pupil of the EPE.

Figure 8:
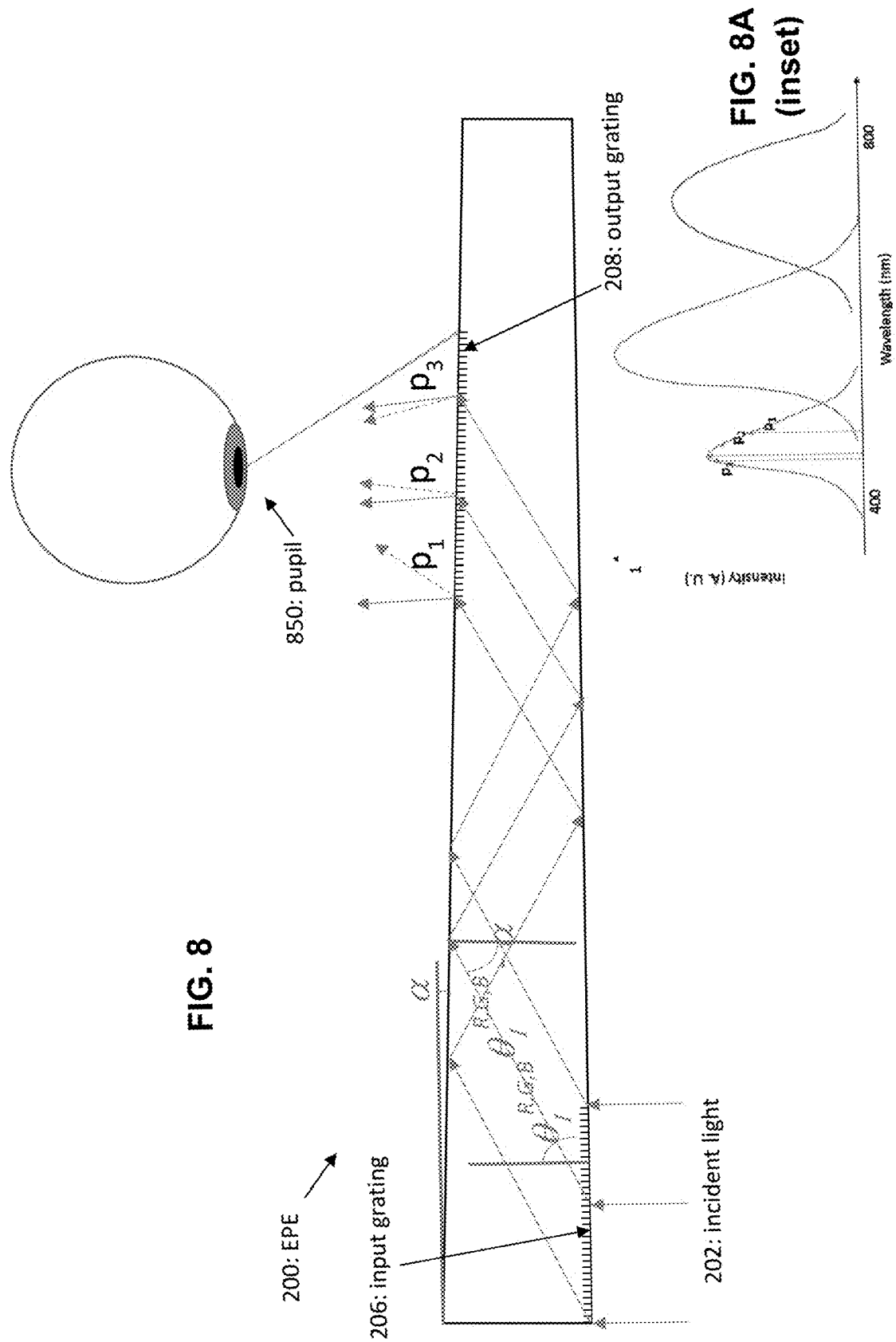
FIG. 8 is a schematic diagram of a wedge-type exit pupil expander similar to that of FIG. 2, but along with the inset FIG. 8A which is similar to FIG. 3 these more fully illustrate exit pupil expansion of only a single wavelength/color.

FIG. 8 illustrates a basic wedge-type EPE 200 similar to that shown at FIG. 2 but illustrating field of view aspects of these teachings; the inset at FIG. 8A is similar in kind to the data plot of FIG. 3. In this illustration the user's field of view is illustrated for only one color, blue which is incident 202 across the entire input grating 206 at zero degrees (normal to the plane of the grating). The solid arrows out-coupled from the output grating 208 represent the directions of the central peak of the color, and this central peak is also delineated at the inset with a solid arrow. The dashed arrows out-coupled from the output grating 208 show the side of the spectrum color that are coupled towards the user's pupil 850, where the dashed arrows $p_1$, $p_2$ and $p_3$ also illustrated at the inset. Note that those dashed arrows are on either side of the color peak even for this basic wedge design. When the user looks at the image projected on the output grating 208 the field of view has the color error that is imposed by the non-parallel channel of the EPE 200, so long as this error is not otherwise compensated within the EPE 200.

One particular technical effect of embodiments of these teachings is an improved color space provided by augmented reality and virtual reality viewing devices, and at a reduced cost. Such augmented reality or virtual reality devices would need to be designed such that the characteristics of the diffraction gratings take into account the wedge angle α but this would be an engineering matter more than compensated by volume sales of these retail end user devices.

Certain of the above embodiments may be described in part by its functionality as an optical channel (the EPE) comprising an entrance pupil enabling light to enter the optical channel; an exit pupil enabling the light to exit the optical channel; a back surface 204 adjacent to the entrance pupil; and a front surface 210 opposite the back surface. In the drawings the entrance pupil is designated by the input grating 206 and the exit pupil is designated by the output grating 208; while typical embodiments will have such gratings at those entrance and exit pupils the gratings themselves are not an essential part of the novel aspects of the optical channel/EPE presented herein. As detailed more particularly above the optical channel/EPE is geometrically configured, that is its shape is designed, such that the light defining a center wavelength that enters the optical channel at the entrance pupil perpendicular to the back surface experiences angularly varying total internal reflection between the front and back surfaces such that the light that exits the optical channel perpendicular to the exit pupil is at a wavelength shifted from the center wavelength. The dashed lines exiting the output grating 208 are perpendicular, and FIG. 3 as well as the inset FIG. 8A illustrate the shift of the dashed line wavelengths as compared to the solid-line peak which is the wavelength that entered the channel at the input grating 206.

Further to the aspects of the invention demonstrated by FIG. 3, in those embodiments the center wavelength (solid line) of the light is expanded by the angularly varying total internal reflection such that a) a first portion of the expanded light that exits the optical channel perpendicular to the exit pupil (the dashed lines) is at a wavelength shifted from the center wavelength; and b) a second portion of the expanded light that exits the optical channel non-perpendicular to the exit pupil (the solid lines) is at the center wavelength. The solid versus dashed line peaks at both FIGS. 3 and 8A show that this second portion of the expanded light that exits the optical channel non-perpendicular to the exit pupil exhibits a greater intensity than the first portion of the expanded light that exits the optical channel perpendicular to the exit pupil.

In the described embodiments the optical channel is geometrically configured such that the front surface and the back surface are non-parallel. While flat non-parallel surfaces are shown curved surfaces can also be employed to take advantage of these teachings. In the specific embodiment of FIG. 5 for a non-virtual reality implementation, the front surface 210 is adjacent to the exit pupil and the optical channel 200 is a see-through exit pupil expander further comprising a compensating wedge 500 disposed adjacent to a portion of the back surface 204 opposite the exit pupil, and this compensating wedge is transparent to incident environmental light 502B and is further geometrically configured to offset angular variance that the optical channel 200 imposes on incident environmental light 502B that passes into the optical channel via the compensating wedge.

FIG. 6 demonstrated an example of a segmented EPE 600, and in this case the front and back surfaces define at least first (600B) and second (600A and/or 600C) discrete geometric segments of the optical channel, wherein the front and back surfaces are parallel in the first discrete geometric segment 600B and non-parallel in at least the second discrete geometric segment 600A/600C.

Another embodiment shown particularly at FIG. 7 had the optical channel/EPE comprising a main channel or body 712 and a wedge overlay 714. In this case the front and back surfaces mentioned above would be considered the front 710A and rear 704A surfaces of the main channel 712; the wedge overlay would define non-parallel front 710B and back 704B overlay surfaces; the wedge overlay would be disposed adjacent to the front surface 710A of the main channel opposite the entrance pupil; and at least some of the angularly varying total internal reflection between the front and back surfaces are between the front surface 710B of the wedge overlay 714 and the back surface 704A of the main channel 712. For simplicity but not by way of limitation we can assume an embodiment with a wedge overlay in which the front 710A and rear 704A surfaces of the main channel 712 are parallel; a particularly useful aspect of the wedge overlay concept is that disposition of a distal end 716 of the wedge overlay 714 relative to the entrance pupil filters incident light 702 passing through the entrance pupil such that only wavelengths above or below a threshold experience the angularly varying total internal reflection while remaining wavelengths experience total internal reflection that is not angularly varying. These are respectively shown by the leftmost ray entering the input grating 706 which is reflected from the front overlay surface 710B back into the main channel 712 and by the rightmost ray entering the input grating 706 which is not reflected 710B back into the main channel 712 from the wedge overlay 714 due to the location of the distal end 716.

Alternatively, certain embodiments of these teachings may be described by the channel's geometry and without functional terms. For example, such an optical channel 200 comprises an entrance pupil enabling light 202 to enter the optical channel; an exit pupil enabling the light to exit the optical channel; a back surface 204 adjacent to the entrance pupil; and a front surface 210 opposite the back surface. As above, the drawings depict the entrance pupil as the input grating 206 and the exit pupil as the output grating 208, and such gratings may be common to most implementations but are not essential, particularly the output grating is not needed if the host device is of the retinal scanning variety. In this way of describing the invention the optical channel is configured such that a first distance 220 at the entrance pupil between the front surface 210 and the back surface 204 is different from a second distance 222 at the exit pupil between the front surface 210 and the back surface 204.

In one such embodiment such as that shown at FIGS. 2 and 5, the front and back surfaces of the optical channel are configured to form a continuous wedge defining an angle α that quantifies an amount of non-parallelism between them. Those particularly illustrated embodiments have the first distance greater than the second distance, but an opposite arrangement is also possible within these teachings.

Though the FIG. 5 embodiment is shown as a continuous wedge this is a non-limiting feature of the see-through/non-virtual reality embodiment of the exit pupil expander where the front surface 210 is adjacent to the exit pupil. In this embodiment the see-through exit pupil expander further comprises a compensating wedge 500 disposed adjacent to a portion of the back surface 204 opposite the exit pupil, and as detailed above this compensating wedge is transparent to incident environmental light 502B and geometrically configured to offset exit pupil expansion that the optical channel/EPE 200 imposes on incident environmental light 502B that passes into the optical channel/EPE via the compensating wedge 500.

The FIG. 6 embodiment has the front and back surfaces defining at least first and second discrete geometric segments of the optical channel, wherein the front and back surfaces are parallel in the first discrete geometric segment and non-parallel in at least the second discrete geometric segment as detailed above in the functional description of the FIG. 6 embodiment.

The embodiment detailed with respect to FIG. 7 has the optical channel comprising a main channel 712 and a wedge overlay 714, and this also is fully described above in the functional description of this embodiment.

Embodiments of these teachings include the overall host device in which such an optical channel/EPE may be deployed. Such a host device is shown by example at FIG. 9 as a head-wearable imaging device which comprises a micro display that would be disposed at the image source 904 and an exit pupil expander disposed between the source 904 and the eyepiece as shown. In such embodiments the exit pupil expander may be as detailed more particularly above with entrance and exit pupils to respectively in-couple and out-couple light from the micro-display and front and back surfaces to angularly vary the total internal reflection of the light passing between those pupils. In some embodiments at least a portion of these front and back surfaces are non-parallel to one another and this region is where the light experiences the angularly varying total internal reflection; as particularly shown at FIGS. 2 and 5-8 these non-parallel portions are flat. In some deployments the head-wearable imaging device is a virtual reality imaging device that isolates the user's field of view from the surrounding environment. In other deployments the head-wearable imaging device is an augmented reality device such as the particular example shown at FIG. 9, in which case there may further be a compensating wedge along the lines of the example at FIG. 5 and disposed opposite the exit pupil such that incident environmental light 502B passes into the exit pupil expander 200 through the compensating wedge 500 and passes out of the exit pupil expander through the exit pupil without total internal reflection.

Figure 9:
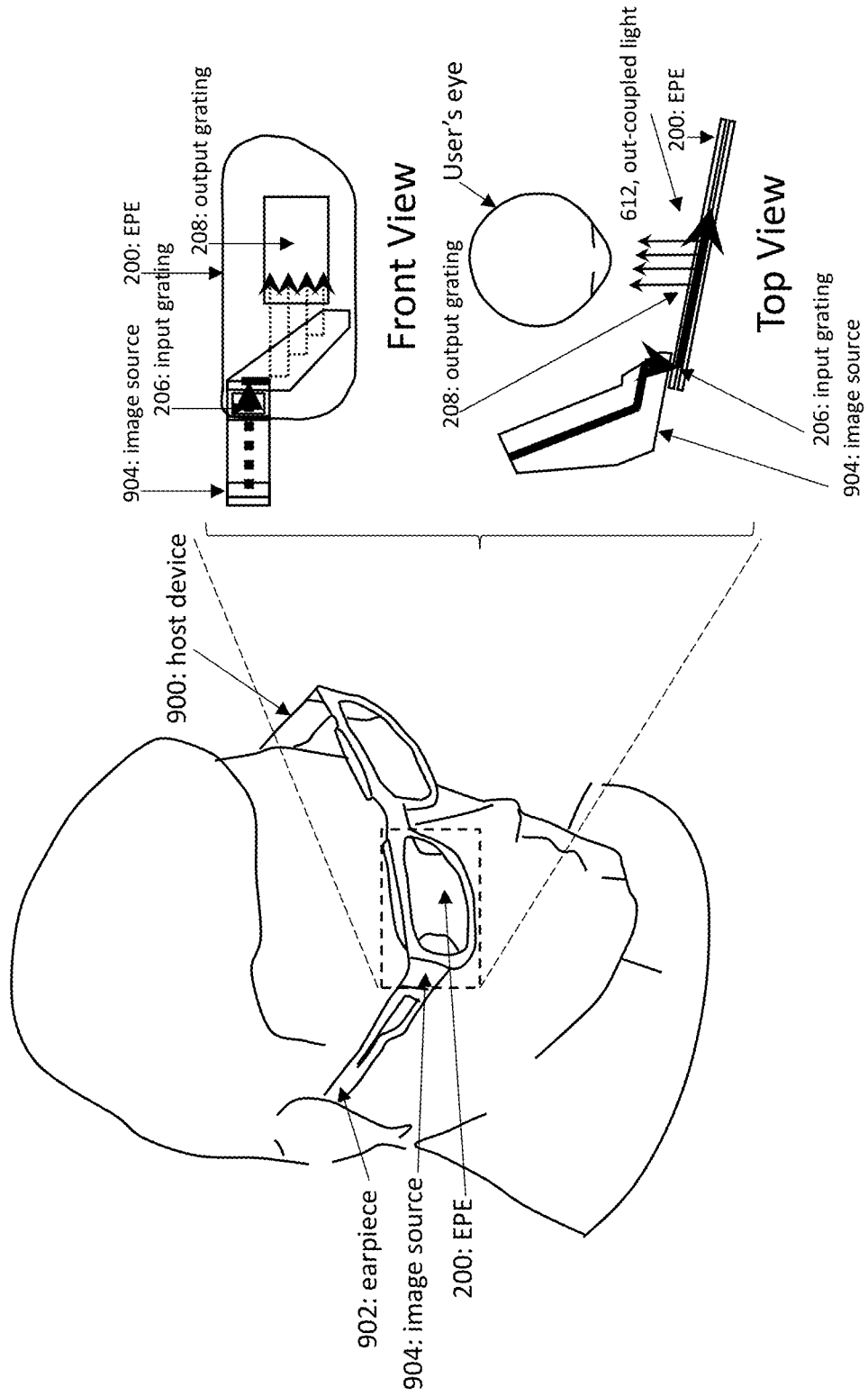
FIG. 9 is a perspective view of a non-virtual reality headset which is one type of device 900 in which embodiments of these teachings may be disposed, with front and top views particularly illustrating one example for placement of an EPE.

FIG. 9 is a perspective view of a non-virtual reality headset which is one type of device 900 in which embodiments of these teachings may be disposed. Typically in host devices that are implemented as eyeglasses such as the host device 900 shown at FIG. 9 the EPE 200 would be disposed to lie along the user's temple when the device is worn, either within the earpiece 902 or separately but substantially alongside the earpiece as FIG. 9 specifically shows. For virtual reality type host devices the EPE 200 may be disposed along the user's temple as FIG. 9 illustrates, or it may be disposed to run laterally along the user's face from the temple to the eye center. In any case there is a computer based image source 904 that provides the incident light to the entrance aperture/input grating for expansion and projection at or from the exit pupil/output grating. In some embodiments the image source 904 may generate the image itself, in others it may include a wireless receiver that receives the digitized image over a Bluetooth or other wireless connection and simply renders the received image for visual presentation.

The various embodiments presented herein provide a fuller appreciation for the scope of the teachings herein, but these are examples and do not themselves represent an inherent limit to the various types of embodiments that can exploit the teachings herein, whether such embodiments relate to the EPE itself or as to how it may be disposed on or within a host device.

What is claimed is:

1. An optical channel comprising:
   an optical channel body;
   an entrance pupil enabling light to enter the optical channel body;
   an exit pupil enabling the light to exit the optical channel body;
   a back surface adjacent to the entrance pupil; and
   a front surface opposite the back surface, wherein the optical channel body is geometrically configured such that the front surface and the back surface form a continuous wedge defining an angle α that quantifies an amount of non-parallelism between the front surface and the back surface and between a plane of the entrance pupil and a plane of the exit pupil, a first distance at the entrance pupil between the front surface and the back surface is greater than a second distance at the exit pupil between the front surface and the back surface light defining a center wavelength that enters the optical channel body at the entrance pupil perpendicular to the back surface experiences angularly varying total internal reflection between the front and back surfaces such that the light that exits the optical channel body perpendicular to the exit pupil is at a wavelength shifted from the center wavelength.

2. The optical channel according to claim 1, wherein the center wavelength of the light is expanded by the angularly varying total internal reflection such that:

a first portion of the expanded light that exits the optical channel body perpendicular to the exit pupil is at a wavelength shifted from the center wavelength; and a second portion of the expanded light that exits the optical channel body non-perpendicular to the exit pupil is at the center wavelength.

3. The optical channel according to claim 2, wherein:
the second portion of the expanded light that exits the optical channel body non-perpendicular to the exit pupil exhibits a greater intensity than the first portion of the expanded light that exits the optical channel body perpendicular to the exit pupil.

4. The optical channel according to claim 1, wherein the front surface is adjacent to the exit pupil and the optical channel body is a see-through exit pupil expander further comprising:
a compensating wedge disposed adjacent to a portion of the back surface opposite the exit pupil, said compensating wedge transparent to incident environmental light and geometrically configured to offset angular variance the optical channel body imposes on incident environmental light that passes into the optical channel body via the compensating wedge.

5. The optical channel according to claim 4, wherein the compensating lens has a surface that is at the angle α relative to the plane of the entrance pupil.

6. The optical channel according to claim 1, wherein the front and back surfaces define at least first and second discrete geometric segments of the optical channel body, wherein the front and back surfaces are parallel in the first discrete geometric segment and non-parallel in at least the second discrete geometric segment.

7. The optical channel according to claim 4, comprising a wedge overlay, wherein:
the said front and back surfaces are front and back surfaces of the optical channel body;
the wedge overlay defines non-parallel front and back overlay surfaces;
the wedge overlay is disposed adjacent to the front surface of the optical channel body opposite the entrance pupil; and
at least some of the angularly varying total internal reflection between the front and back surfaces are between the front surface of the wedge overlay and the back surface of the optical channel body.

8. The optical channel according to claim 7, wherein:
disposition of a distal end of the wedge overlay relative to the entrance pupil filters incident light passing through the entrance pupil such that only wavelengths above or below a threshold experience the angularly varying total internal reflection while remaining wavelengths experience total internal reflection that is not angularly varying.

9. An optical channel comprising:
an optical channel body;
an entrance pupil enabling light to enter the optical channel body;
an exit pupil enabling the light to exit the optical channel body;
a back surface adjacent to the entrance pupil; and
a front surface opposite the back surface;
wherein the optical channel body is configured such that the front and back surfaces of the optical channel form a continuous wedge defining an angle α that quantifies an amount of non-parallelism between the front surface and the back surface and between a plane of the entrance pupil and a plane of the exit pupil, light that enters the optical channel body at the entrance pupil experiences total internal reflection between the front and back surfaces, and a first distance at the entrance pupil between the front surface and the back surface is greater than a second distance at the exit pupil between the front surface and the back surface.

10. The optical channel according to claim 9, wherein the front surface is adjacent to the exit pupil and the optical channel body is a see-through exit pupil expander further comprising:
a compensating wedge disposed adjacent to a portion of the back surface opposite the exit pupil, said compensating wedge transparent to incident environmental light and geometrically configured to offset exit pupil expansion that the optical channel body imposes on incident environmental light that passes into the optical channel body via the compensating wedge.

11. The optical channel according to claim 9, wherein the front and back surfaces define at least first and second discrete geometric segments of the optical channel body, wherein the front and back surfaces are parallel in the first discrete geometric segment and non-parallel in at least the second discrete geometric segment.

12. The optical channel according to claim 9 comprising a wedge overlay, wherein:
the front and back surfaces are front and back surfaces of the optical channel body;
the wedge overlay defines non-parallel front and back overlay surfaces;
the wedge overlay is disposed adjacent to the front surface of the optical channel body opposite the entrance pupil such that the first distance is between the back surface of the optical channel body and the front overlay surface; and
at least some of the light entering the optical channel body via the entrance pupil is reflected from the front overlay surface back into the optical channel body towards the back surface of the optical channel body.

13. The optical channel according to claim 12, wherein:
disposition of a distal end of the wedge overlay relative to the entrance pupil filters incident light passing through the entrance pupil such that only wavelengths above or below a threshold are reflected from the front overlay surface into the optical channel body while remaining wavelengths reflected from the front overlay surface are not.

14. A head-wearable imaging device comprising a micro display and an exit pupil expander, wherein the exit pupil expander comprises:
an optical channel body;
an entrance pupil configured to in-couple light from the micro-display;
an exit pupil configured to out-couple light from the exit pupil expander;
a back surface adjacent to the entrance pupil; and
a front surface opposite the back surface, wherein the optical channel body is geometrically configured such that the front surface and the back surface form a continuous wedge defining an angle α that quantifies an amount of non-parallelism between the front surface and the back surface and between a plane of the entrance pupil and a plane of the exit pupil, a first distance at the entrance pupil between the front surface and the back surface is greater than a second distance at the exit pupil between the front surface and the back surface, light defining a center wavelength that enters the optical channel body at the entrance pupil perpendicular to the back surface experiences angularly varying total internal reflection between the front and back surfaces such that the light that exits the optical channel body perpendicular to the exit pupil is at a wavelength shifted from the center wavelength.

15. The head-wearable imaging device according to claim 14, wherein the at least portion of the front and back surfaces that are non-parallel are flat.

16. The head-wearable imaging device according to claim 14, wherein the head-wearable imaging device is a virtual reality imaging device.

17. The head-wearable imaging device according to claim 14, wherein the head-wearable imaging device is an augmented reality device further comprising a compensating wedge disposed opposite the exit pupil such that incident environmental light that passes into the exit pupil expander through the compensating wedge passes out of the exit pupil expander through the exit pupil without total internal reflection.

* * * * *